May 31, 1966 E. O. P. TATTER ETAL 3,253,832

RECORD CHANGER

Original Filed March 14, 1962 2 Sheets-Sheet 1

INVENTORS
ERNEST O. P. TATTER
PAUL W. SCHAFF

BY Hofgren, Brady, Wegner, Allen & Stellman
attys

United States Patent Office 3,253,832

Patented May 31, 1966

3,253,832

RECORD CHANGER

Ernest O. P. Tatter, Addison, and Paul W. Schaff, Arlington Heights, Ill., assignors to Warwick Electronics Inc., a corporation of Delaware Original application Mar. 14, 1962, Ser. No. 179,680, now Patent No. 3,218,079, dated Nov. 16, 1965. Divided and this application Mar. 20, 1964, Ser. No. 353,444
8 Claims. (Cl. 274—10)

This invention relates to a record changer with a record balancer and, more particularly, to a record balancer which aids to prevent unnecessary wear or damage to the records.

This application is a division of application Serial No. 179,680 of Paul W. Schaff, filed March 14, 1962, for a Record Changer and now Patent No. 3,218,079.

In standard record changes having a spindle extending upwardly from a turntable, a shoulder is provided upon which the record stack rests. This results in shifting the center of gravity of a record to a position offset from the point of support of a record on the shoulder, with the result that a record tends to wobble around on the shoulder and assume a tilted position. This results in the high edge of the tilted record engaging against and likely scratching the playing grooves of a second record being placed on the spindle. This tilting can also occur when a relatively few records are initially placed on the spindle. It is also possible that the lowermost record can be jarred off the shoulder and fall onto the turntable.

Accordingly, an object of this invention is to provide a new and improved method of stacking records on a spindle with means for balancing one or more records in a horizontal position on the spindle shoulder.

Another object of the invention is to provide means for balancing records stacked individually one at a time, rather than loading a whole stack at once, with each record being balanced horizontally, making it easier to handle the record due to the avoidance of any tendency of a record to wobble or tilt which reduces finger marks on the playing grooves as well as scratches or dirt which would result in surface noise.

A further object of the invention is to provide a record balancing arm which is located in a position to support records during loading of the spindle and which is connected to an ejector lever of the changer that is provided within the spindle, for movement of the balancing arm to an out-of-the-way position during a record change cycle.

Further objects and advantages will become apparent from the following detailed description taken in connection with the accompanying drawings in which.

Figure 1:
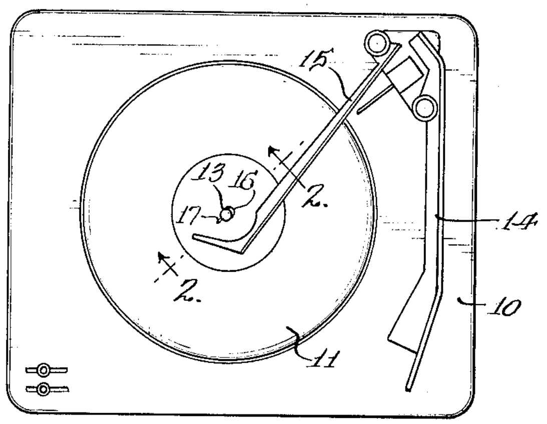
FIG. 1 is a plan view of a record changer showing a preferred embodiment of the invention.

While this invention is susceptible of embodiment in many different forms, there is shown in the drawings and will herein be described in detail an embodiment of the invention, together with modifications thereof, with the understanding that the present disclosure is to be considered as an exemplification of the principles of the invention and is not intended to limit the invention to the embodiment illustrated. The scope of the invention will be pointed out in the appended claims.

In the preferred embodiment shown in FIGS. 1–7, a record changer has a motorboard 10 which rotatably mounts a turntable 11 by known means indicated generally at 12 with a centrally located stationary spindle 13 extending upwardly from the turntable. As is known in the art, the motorboard movably mounts a tone arm 14 and a record hold-down member 15 which is movable to the position shown in FIGS. 1 and 2 to yieldably rest upon the upper side of a stack of records and hold the records on the spindle 13 in a known manner.

The spindle 13 is provided with a record stack supporting shoulder or shelf 16 upon which the lowermost record of a record stack may rest. Due to the support of a record on the shoulder at one side of the central hole thereof, the center of gravity of a record is offset. This can result in a record moving to a tilted position when one or only a few records are supported on the spindle during loading, and the hold-down member 15 is withdrawn.

In order to prevent this, a balancing member in the form of an arm 17 is located to engage the underside of a record near the center of gravity thereof to prevent tilting. The movements of the balancing arm 17 are controlled by an ejector lever 18 mounted within the spindle. The ejector lever 18 is mounted for pivotal movement as well as up and down movement by a slot 19 formed therein which receives a pin 20 affixed to the spindle. The lever is normally urged to an upper slightly inclined position shown in FIGS. 2 and 3 by a spring 21 affixed to the motorboard and which engages a lower end 22 of the lever. In this position, the lever has an upper end 23 located somewhat within the hole of the lowermost record on the stack as will be seen in FIGS. 2 and 3. The lever 18 is pivoted about the pin 20 and against the action of the spring 21 by a movable part 24 of the change cycle mechanism of the record changer which is moved through a cycle in a known manner. This movement places the ejector lever in the position shown in FIG. 4 in which the lever is within the spindle and is against an abutment pin 25 secured to the spindle. This positioning of the lever 18 is permitted by a space 26 obtained by forming the spindle from two similar halves which are assembled in spaced-apart relation. As will be seen by comparing FIGS. 3 and 4, the clockwise movement of the ejector lever 18 has moved the lowermost record off the spindle shoulder and aligned it with the lower part of the spindle so that the record can move down onto the turntable 11. As is well known in the art, succeeding records in the stack are caused to move down onto the spindle shoulder by means of a slide member 27 mounted in the upper part of the spindle and having an elongated slot 28 receiving a pair of pins 29 and 30 secured in the spindle. The slider member 27 is normally in the position shown in the figures, but can move to a position within the spindle when a record stack is being removed from the turntable along the spindle.

The balancing arm 17 is pivoted to the spindle by a pin 31 fixed in the spindle and extending through a generally triangularly-shaped opening 32 in the ejector lever 18. The balancing arm 17 has a U-shaped lower end providing legs 33 and 34 through which the pin 31 extends. The slot 32 in the ejector lever permits the vertical movement of the ejector lever relative to the pin 31.

Figure 2:
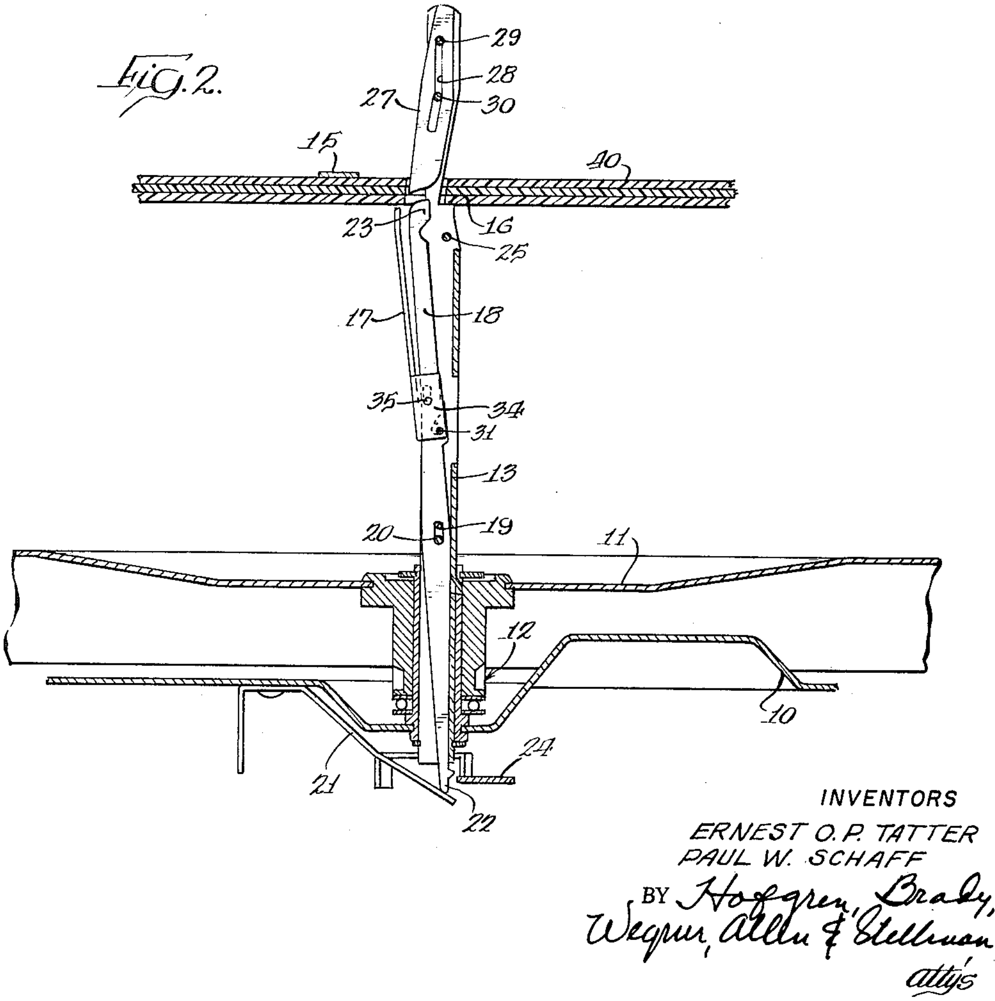
FIG. 2 is a vertical fragmentary section, taken generally along the line 2—2 in FIG. 1, and on an enlarged scale.
Figures 3, 4, 5, 6, 7:
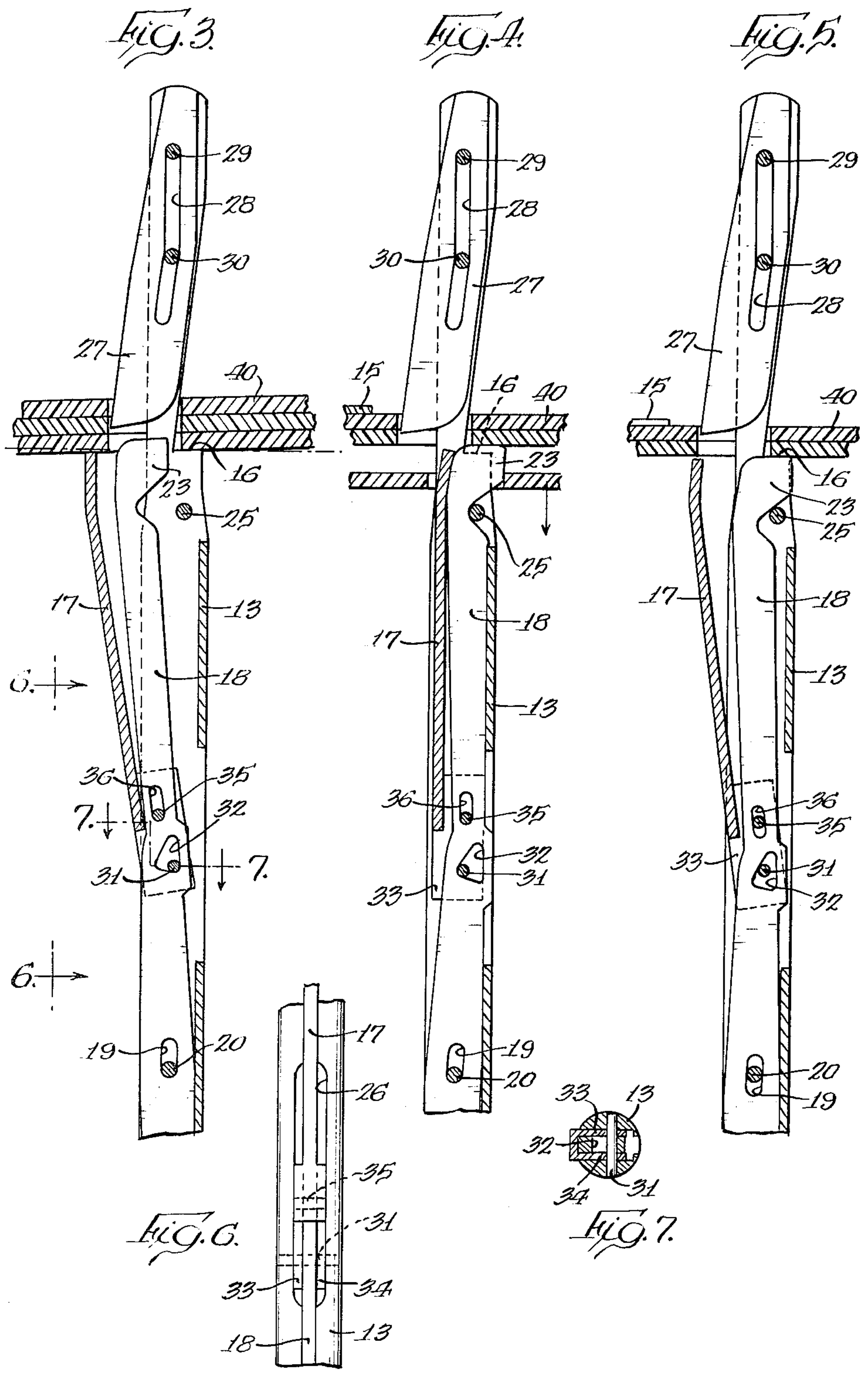
FIG. 3 is a fragmentary enlarged view showing the spindle similarly to FIG. 2.
FIG. 4 is a view similar to FIG. 3 showing the ejector lever and balance arm in a position within the spindle during the dropping of a record.
FIG. 5 is a view comparable to FIG. 3 showing the components in an intermediate position.
FIG. 6 is a vertical fragmentary view taken along the line 6—6 in FIG. 3.
FIG. 7 is a horizontal section taken generally along the line 7—7 in FIG. 3.

The balancing arm 17 is movable between a record supporting position, shown in FIGS. 2 and 3, to a pos'tion within the spindle, as shown in FIG. 4, by a connection with the ejector lever 18 including pin 35 extending between the legs 33 and 34 of the balancing member and engageable in an elongate slot 36 in the ejector lever.

With the parts in the normal at rest position shown in FIG. 3, the upper end of the balancing arm 17 is located adjacent but slightly below the level of the spindle shoulder 16 to support one or more records on the shoulder which would otherwise tend to tilt downwardly to the left as viewed in FIG. 3, but permitting a slight amount of tilt due to the upper end of the balancing arm being at a slightly lower level. This condition exists when the hold-down member 15 is not resting upon the top of the stack; however, when this member is placed on the stack, the record stack will level out, so that the balance arm 17 is clear of the underside of a record and may move to the position shown in FIG. 4 without interference with a record.

In operation of the mechanism, the change cycle member 24 will pivot the ejector lever about the pivot pin 20 to move the ejector lever to the position shown in FIG. 4 and at the same time the balance arm 17 will move at a greater rate to a position engaging an edge of the ejector lever, as shown in FIG. 4, by the slot and pin connection 35 and 36 between the parts. This increased rate of movement is derived from the fact that the connection between the ejector lever and balance arm are at a distance from the pivot for the balance arm and an even greater distance from the pivot for the ejector lever.

A position of the parts in shown in FIG. 5 in which the ejector lever 18, through its support by the spring 21, is assisting in lowering of the record stack onto the spindle shoulder 16 and has been partly lowered and pivoted counterclockwise with the result that the balance arm 17 has moved at least partially toward the position shown in FIG. 3.

It will be apparent that records 40, including seven-inch, ten-inch and twelve-inch, can be handled by the mechanism.

With the construction disclosed herein, it will be seen that a balance arm has been provided to assist in placing one or relatively few records on a spindle shoulder, without resultant tilting of the records, which has frequently resulted in records falling to the turntable or such tilted records interfering with subsequent records placed on the spindle. The balancing member engages under a record to substantially prevent the tilting and does not interfere with movement of a record from the spindle shoulder to the turntable or removal of one or more records from the turntable.

We claim:

1. In a record changer, a motorboard, a turntable rotatably supported on the motorboard, a record spindle extending centrally from the turntable, a shoulder on said spindle at a distance from the turntable for supporting a stack of records with the center of gravity of a record on the shoulder offset from the axis of the spindle, and movable means mounted on said spindle beneath said shoulder, said movable means having a record support surface immediately below said shoulder movable to a position to support a record placed on the shoulder to prevent tilting thereof.

2. In a record changer as defined in claim 1 in which said movable means engages a record solely at the side of a record's center of gravity opposite from the engagement of a record with said shoulder, a plurality of changer operating components, and means connecting said movable means to one of said components whereby the position of said movable means is controlled by said components.

3. In a record changer, a motorboard, a turntable rotatably supported on the motorboard, a record spindle extending centrally from the turntable, a shoulder on said spindle at a distance from the turntable for supporting a stack of records with the center of gravity of a record on the shoulder offset from the axis of the spindle, a balance member mounted on the spindle beneath said shoulder, said balance member extending over the turntable and having a record support surface immediately below said shoulder for supporting a record on the shoulder, and means mounting the balance member for movement to a non-supporting position within the spindle.

4. In a record changer as defined in claim 3, including means mounting said balance member for free pivoting movement by engagement of a record stack therewith upon removal of the stack from the turntable.

5. In a record changer, a motorboard, a turntable rotatable supported on the motorboard, a record spindle extending centrally from the turntable, a shoulder on said spindle at a distance from the turntable for supporting a stack of records with the center of gravity of a record on the shoulder offset from the axis of the spindle, a lever for ejecting a record from said spindle shoulder, a balance member mounted on the spindle and extending over the turntable to a position of support for a record on the shoulder, means mounting the balance member for movement to a non-supporting position within the spindle, and means interconnecting the balance member and lever whereby movement of the ejector lever to eject a record off the shoulder moves the balance member to a position within the perimeter of the spindle.

6. In a record changer, a turntable, a record spindle extending upwardly from the turntable, a record supporting shoulder on said spindle, an ejector lever pivotally mounted on the spindle for ejecting a record from the shoulder for dropping to the turntable, a record supporting balance member pivoted on the spindle with an upper end located adjacent the level of the shoulder and spaced from the ejector lever, a slot in the spindle of a size to receive the balance member, and means interconnecting the ejector lever and balance member whereby pivotal movment of the ejector lever to eject a record pivots the balance member at a greater rate than the ejector lever to bring the balance member into said slot to permit dropping of a record to the turntable.

7. In a record changer, a turntable, a record spindle extending upwardly from the turntable, a record supporting shoulder on said spindle, an ejector lever pivotally mounted on the spindle for ejecting a record from the shoulder for dropping to the turntable, a record supporting balance member pivoted on the spindle with an upper end located adjacent the level of the shoulder and spaced from the ejector lever, a slot in the spindle of a size to receive the balance member, and a pin connecting the balance member to the ejector lever at a distance from the pivot point for the shelf member and a greater distance from the pivot point for the ejector lever whereby pivoting of the ejector lever pivots the balance member at a greater rate to bring the ejector lever and balance member together within the spindle when a record is ejected from the shoulder.

8. In a record changer as defined in claim 7 in which the ejector lever is provided with three elongate slots to permit movement lengthwise of the spindle associated one with a pin to pivot the ejector lever on the spindle and permit vertical movement, another to freely receive a second pin pivoting the balance member on the spindle, and a third to receive said pin connecting the balance member to the ejector lever.

References Cited by the Examiner

UNITED STATES PATENTS

| | | | |
|---|---|---|---|
| 3,162,448 | 12/1964 | Van der Lely | 274—105 |
| 3,163,427 | 12/1964 | Tatter | 274—10 |

NORTON ANSHER, *Primary Examiner.*

C. B. PRICE, *Assistant Examiner.*